(12) United States Patent
Zhao

(10) Patent No.: US 8,650,348 B2
(45) Date of Patent: *Feb. 11, 2014

(54) DAUGHTER CIRCUIT BOARD OF AN ELECTRONICALLY COMMUTATED MOTOR FOR COMMUNICATING A MOTOR CONTROLLER WITH A CONTROL SYSTEM OF A USER TERMINAL

(75) Inventor: Yong Zhao, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 187 days.

This patent is subject to a terminal disclaimer.

(21) Appl. No.: 13/308,511

(22) Filed: Nov. 30, 2011

(65) Prior Publication Data

US 2012/0142201 A1 Jun. 7, 2012

(30) Foreign Application Priority Data

Dec. 2, 2010 (CN) .................... 2010 2 0650878 U

(51) Int. Cl.
*H05K 7/10* (2006.01)
*G06F 13/40* (2006.01)
(52) U.S. Cl.
CPC .................. *G06F 13/409* (2013.01)
USPC ............................... 710/301; 710/105
(58) Field of Classification Search
USPC ............ 710/300–317, 62–64, 72–74, 8–19, 710/104–106
See application file for complete search history.

(56) References Cited

U.S. PATENT DOCUMENTS

2013/0169200 A1* 7/2013 Zhao .......................... 318/255

* cited by examiner

*Primary Examiner* — Raymond Phan
(74) *Attorney, Agent, or Firm* — Matthias Scholl P.C.; Matthias Scholl

(57) ABSTRACT

A daughter circuit board of an electronically commutated motor for interface signal conversion, having circuit units integrated on the daughter circuit and eight ports for communicating with a control system of a user terminal, the daughter circuit board being plugged into a motor controller for signal conversion so that the motor controller communicates with the control system of the user terminal. The eight ports include an input port of power supply, a port of mode selection, a signal port of PWM, a R/T port for data transmission between the daughter circuit board and the control system of the user terminal, a port of COM, a port for fault signal output, a port of power indication, and a port of speed feedback. The daughter circuit board is simple, easy to correspond with various control systems of user terminals, and accords to the latest electric standard thereby facilitating management and popularization.

3 Claims, 7 Drawing Sheets

DAUGHTER CIRCUIT BOARD OF AN ELECTRONICALLY COMMUTATED MOTOR FOR COMMUNICATING A MOTOR CONTROLLER WITH A CONTROL SYSTEM OF A USER TERMINAL

CROSS-REFERENCE TO RELATED APPLICATIONS

Pursuant to 35 U.S.C. §119 and the Paris Convention Treaty, this application claims the benefit of Chinese Patent Application No. 201020650878.7 filed on Dec. 2, 2010, the contents of which are incorporated herein by reference.

BACKGROUND OF THE INVENTION

1. Field of the Invention

The invention relates to a daughter circuit board of an electronically commutated motor (ECM) for interface signal conversion.

2. Description of the Related Art

As shown in FIGS. 1 and 2, a conventional ECM includes a main body and a controller. The main body has a stator assembly and a rotor assembly. The controller should correspond with both the main body and a control interface of a control system of a user terminal. Different control systems of user terminals correspond with different control signals. For example, both a control system of an air-conditioner and a control system of a washing-machine belong to control system of user terminals, but the control signals thereof are completely different. Conventionally, for each specific control system of a user terminal, a motor and a controller thereof are developed accordingly, which, however, brings about the following disadvantages: 1) a variety of motors have to be manufactured, which results in inconvenient management and standardization; 2) the development for motors takes time and increases the production costs; and 3) the newly-developed motor has a narrow application scope and is inconvenient for popularization.

To solve the above-described problems, a motor controller including a mother circuit board and a daughter circuit board butted therewith has been introduced. Main functional circuits of the motor controller are disposed on the mother circuit board. Different interface circuit units and identify circuits are disposed on different daughter circuit boards. When one daughter circuit board is butted with the mother circuit board, the identify circuit of the daughter circuit board sends messages to a central control and process unit of the mother circuit board. Thereafter, the central control and process unit automatically assigns an input/output port for the daughter circuit board. Thus, through cooperation with various daughter circuit boards, the motor controller can be applied to various occasions, i.e., has a wide application. Consequently, the motor manufactures do not need to produce a large number of motors, thereby reducing the management and development costs, simplifying the production process, and improving the efficiency.

Specifically, as shown in FIGS. 3-5, a motor controller includes a central control and process unit, an interface circuit unit, and an identify circuit. The central control and process unit is disposed on a mother circuit board. The interface circuit unit and the identify circuit are disposed on a daughter circuit board. The mother circuit board and the daughter circuit board are butted with each other to form an electric connection. The identify circuit inputs an identify signal to the central control and process unit, and then the central control and process unit automatically assigns an input/output port for the interface circuit unit according to the identify signal.

Identify circuits corresponding with different interface circuit units output different signals, thereby forming different daughter circuit boards. An output end of the central control and process unit is connected to a power drive circuit module. An input end of the central control and process unit is connected to an output end of a rotor position sensing circuit. The power drive circuit module and the rotor position sensing circuit are disposed on the mother circuit board. A power supply circuit and an analog sensing circuit are also disposed on the mother circuit board. The power supply circuit supplies power to all the circuits. The central control and process unit is a CPU, a micro control unit (MCU), or a digital signal processor (DSP). A port 3 is disposed on the mother circuit board and includes eleven terminal lugs E, N, L, M1, M2, M3, M4, M5, M6, M7, and M8. There may be a plurality of daughter circuit boards, for example, a first daughter circuit board, a second daughter circuit board, and a third daughter circuit board. A slot 1 is disposed on the mother circuit board, and a plug connector 2 is disposed on the daughter circuit board. The plug connector 2 is received in the slot 1 thereby electrically connecting the daughter circuit board with the mother circuit board.

To standardize the signal mode of daughter circuit boards and benefit the correspondence thereof with various control systems of user terminals, it's necessary to standardize reasonably the daughter circuit boards to form a basically consistent electric standard so as to facilitate management and application.

SUMMARY OF THE INVENTION

In view of the above-described problems, it is one objective of the invention to provide a daughter circuit board of an electronically commutated motor for interface signal conversion that is simple, easy to correspond with various control systems of user terminals, and accords with the latest electric standard thereby facilitating management and popularization.

To achieve the above objective, in accordance with one embodiment of the invention, there provided is a daughter circuit board of an electronically commutated motor for interface signal conversion, comprising circuit units integrated on the daughter circuit board and eight ports for communicating with a control system of a user terminal, the daughter circuit board being plugged into a motor controller for signal conversion so that the motor controller communicates with the control system of the user terminal, wherein the eight ports comprise:

M1: an input port of power supply, 10-35 V DC;

M2: a port of mode selection, which inputs signals to the daughter circuit board and employs a torque mode at low level and a speed mode at high level;

M3: a signal port of pulse width modulation (PWM), which inputs PWM signals having a frequency to the daughter circuit board, and the signals are rotary speed/torque control command of a motor;

M4: a R/T port for data transmission between the daughter circuit board and the control system of the user terminal, in which a bidirectional asynchronous half-duplex communication data line is employed, and voltage direct current (VDC) is employed at high level and signal ground (SG) is employed at low level;

M5: a port of component object mode (COM), which is a ground line of signal lines and a common terminal of control signals;

M6: a port for fault signal output, through which the daughter circuit board outputs a fault signal to the control system of the user terminal under error state, and the motor is under error state at high level, and under normal state at low level;

M7: a port of power indication, through which the daughter circuit board outputs PMW power signals to the control system of the user terminal using an open collector (OC); the power is calculated by duty cycle of PWM; and M8: a port of speed feedback, through which the daughter circuit board outputs speed signals to the control system of the user terminal using the open collector (OC); the speed signal is calculated based on output pulse number per rotation.

In a class of this embodiment, a voltage of the port of mode selection is 24 V.

In a class of this embodiment, the signal port of PWM comprises 60-100 HZ of PWM signals and has a voltage of 24 V.

Advantages of the invention are summarized below: the daughter circuit board of the invention communicates with a control system of a user terminal using eight ports, which employs a simple electric standard and facilitates corresponding with the control system of the user terminal easily, thereby avoiding involving excessive types of daughter circuit boards and benefitting to manage and popularize.

DETAILED DESCRIPTION OF THE EMBODIMENTS

Detailed description will be given below in conjunction with specific embodiments and accompanying drawings.

Figure 1:
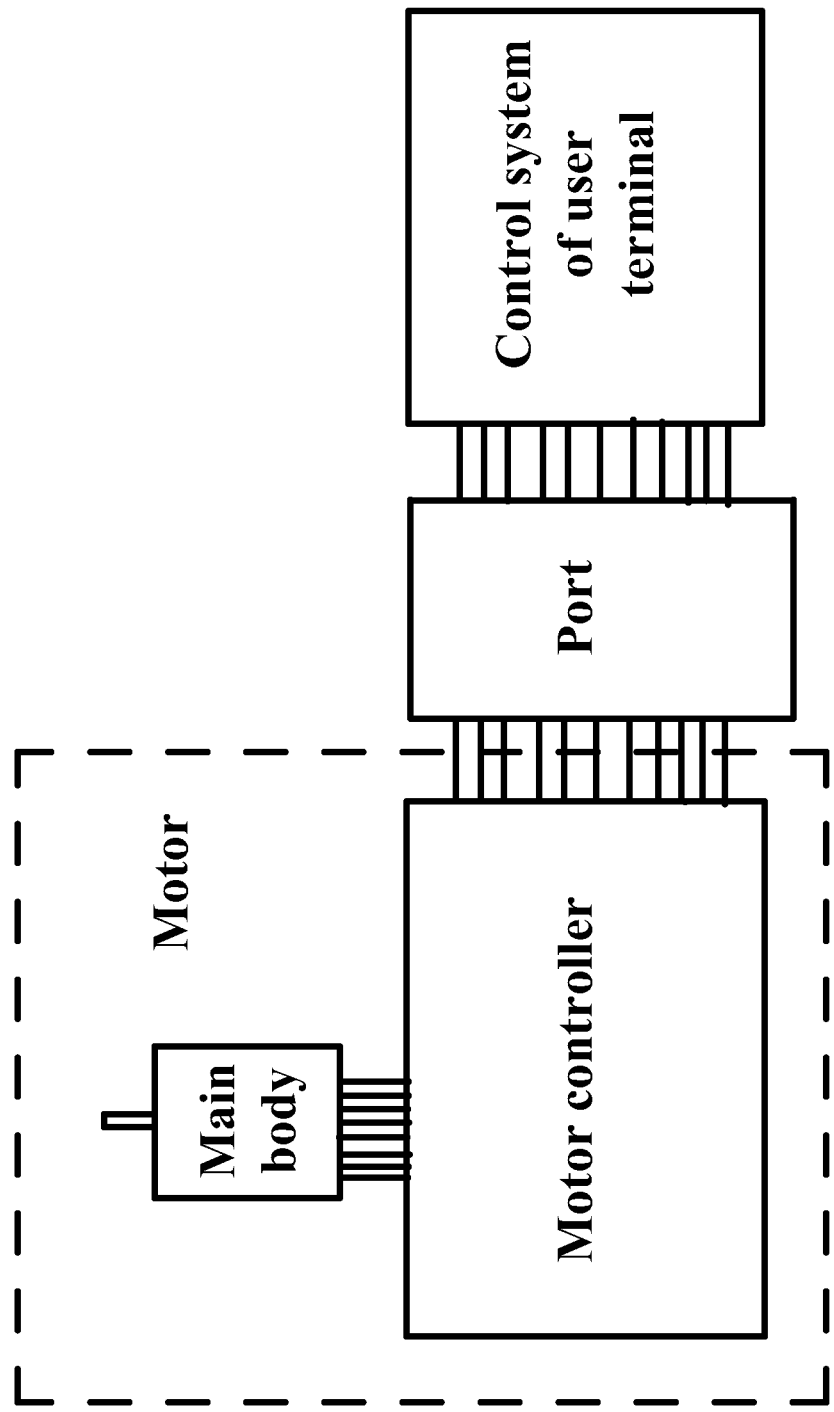
FIG. 1 is a schematic diagram of connection between a motor controller and a control system of a user terminal in the prior art.
Figure 2:
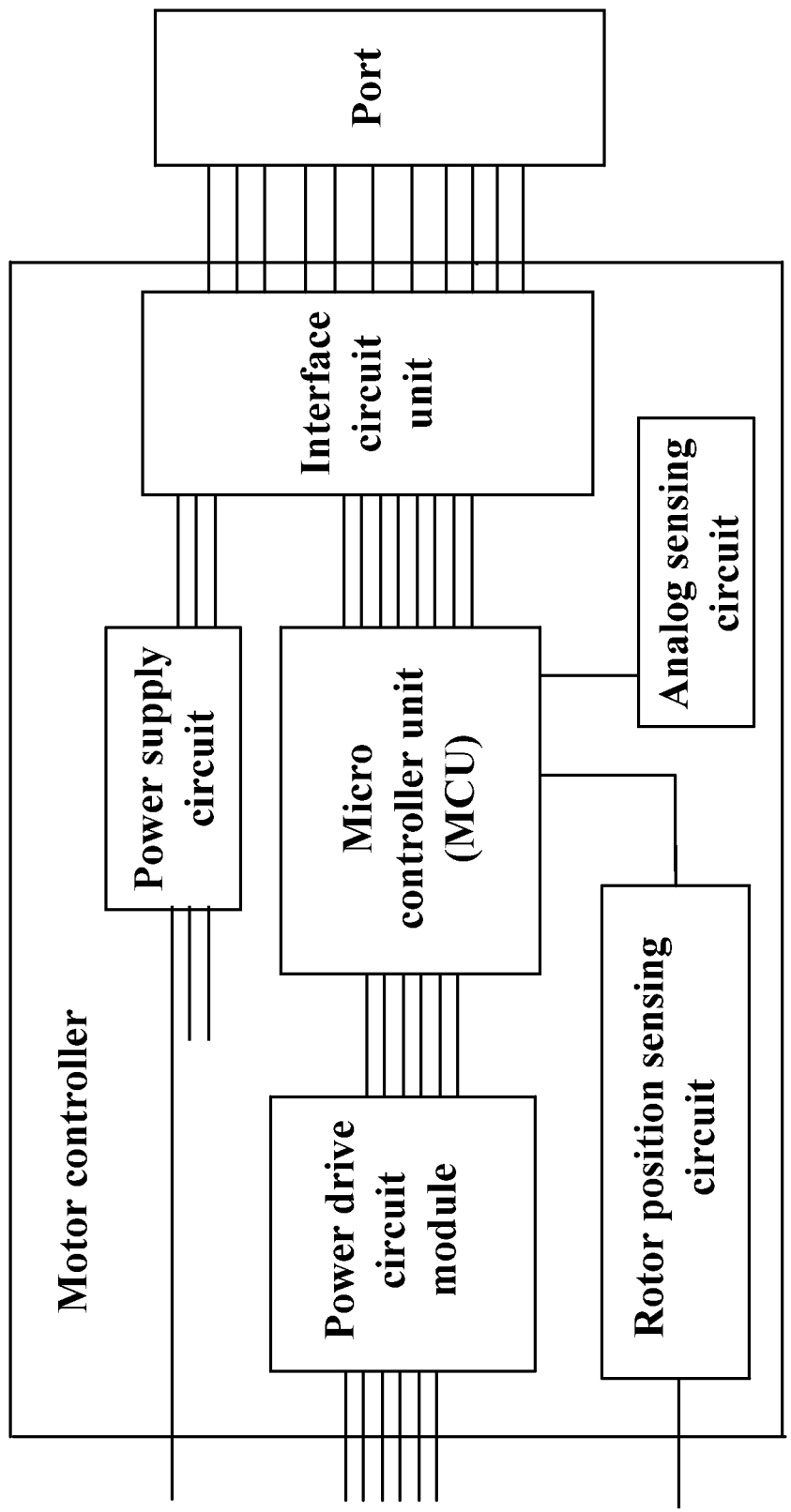
FIG. 2 is a block diagram of a motor controller in the prior art.
Figure 3:
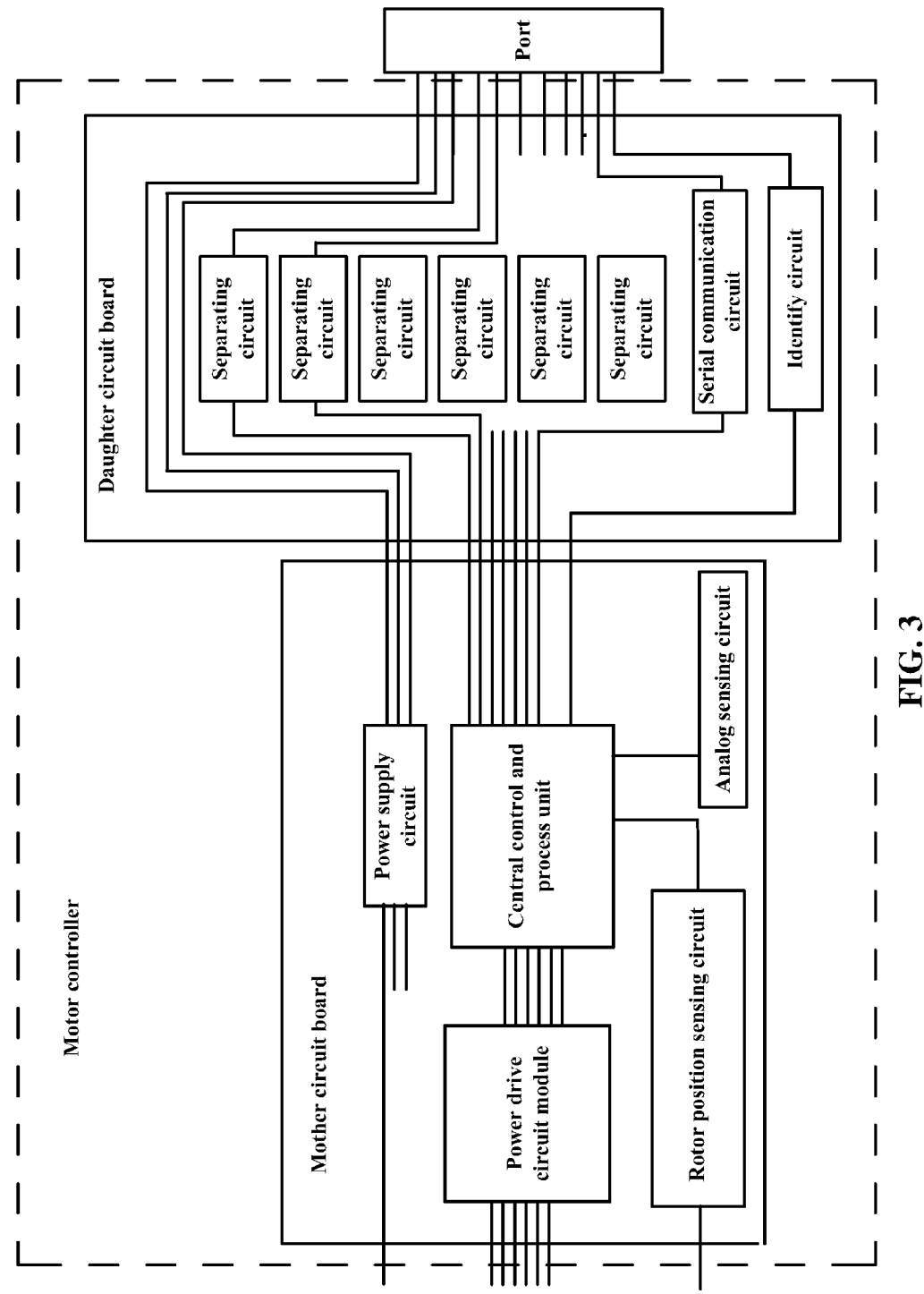
FIG. 3 is a schematic diagram of a motor controller having a mother and a daughter circuit board in the prior art.
Figure 4:
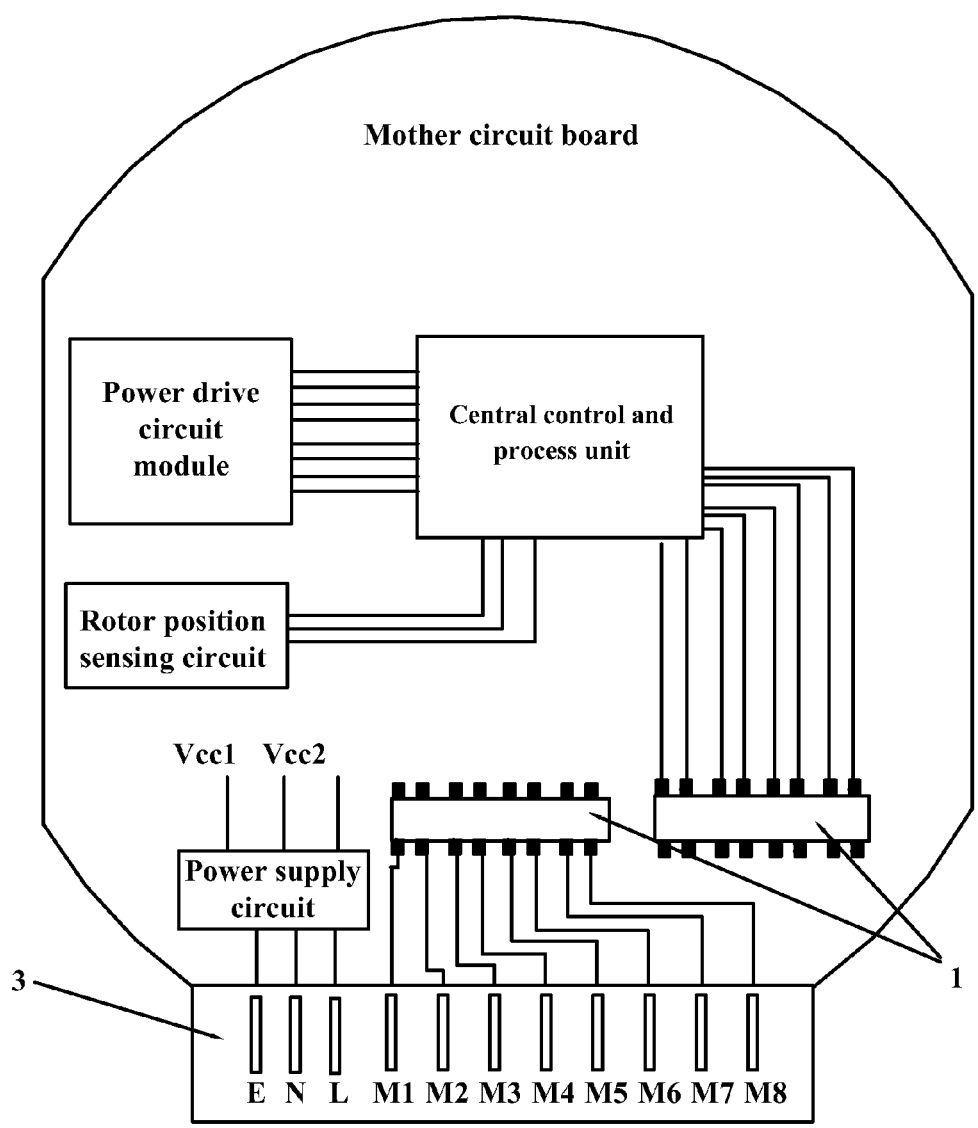
FIG. 4 is a schematic diagram of a mother circuit board of a motor controller in the prior art.
Figure 5:
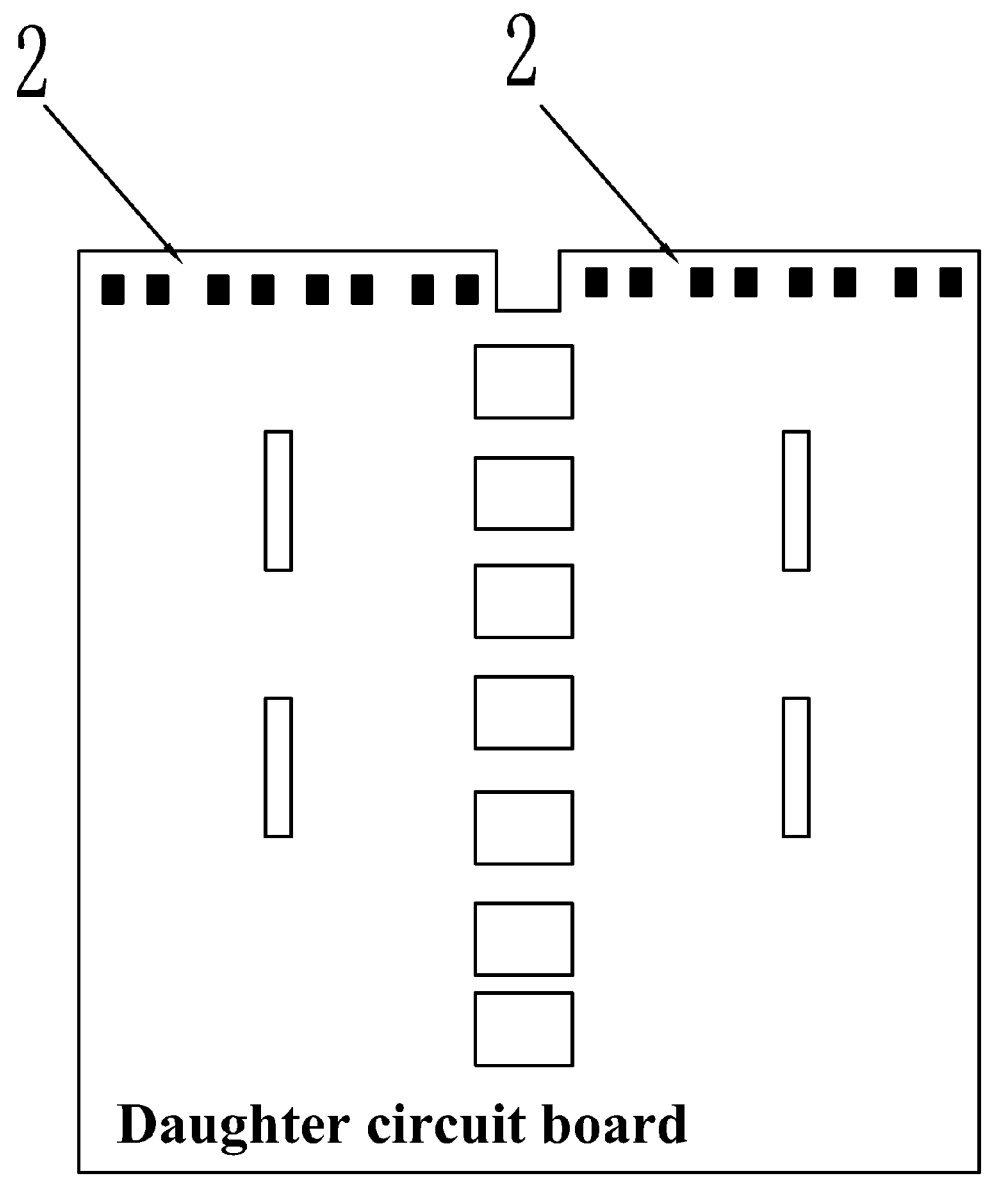
FIG. 5 is a schematic diagram of a daughter circuit board of a motor controller in the prior art.
Figure 6:
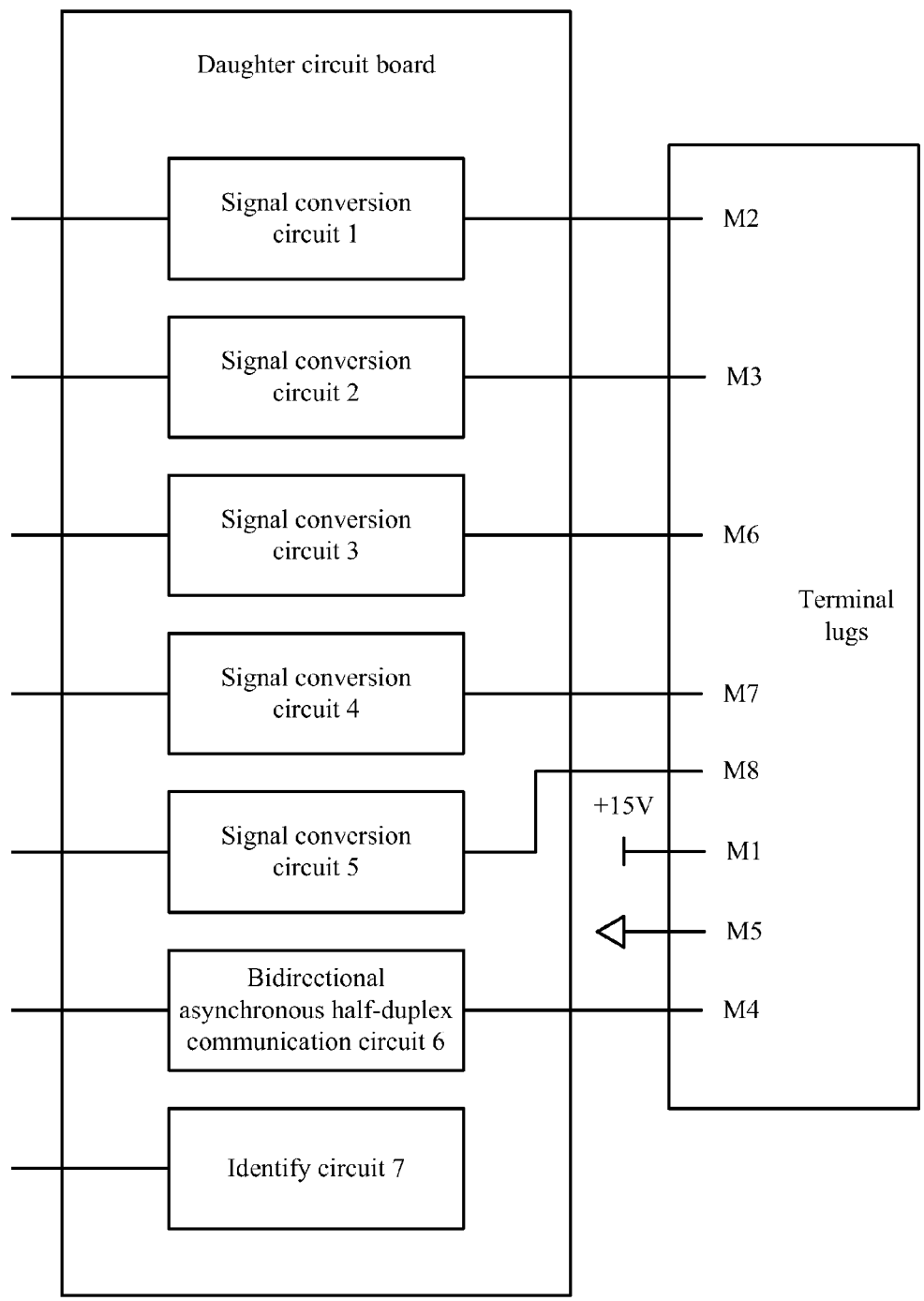
FIG. 6 is a block diagram of a daughter circuit board in accordance with one embodiment of the invention.
Figure 7:
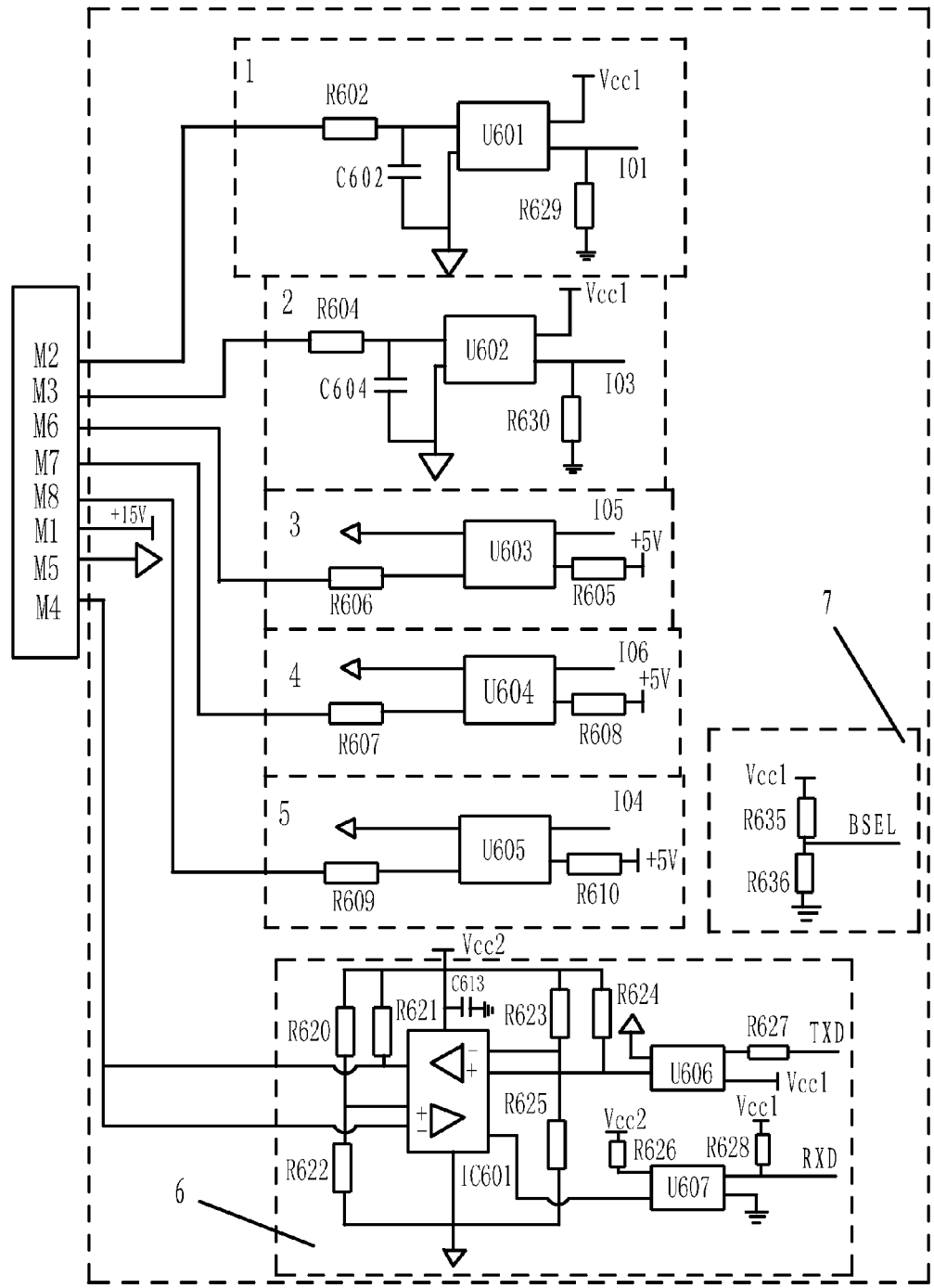
FIG. 7 is a circuit diagram of the daughter circuit board of FIG. 6.

As shown in FIGS. 6 and 7, a daughter circuit board of an electronically commutated motor for interface signal conversion, comprises circuit units integrated on the daughter circuit and eight ports for communicating with a control system of a user terminal, the daughter circuit board being plugged into a motor controller for signal conversion so that the motor controller communicates with the control system of the user terminal, wherein the eight ports comprise:

M1: an input port of power supply, 10-35 V DC;

M2: a port of mode selection, which inputs signals to the daughter circuit board and employs a torque mode at low level and a speed mode at high level; the signals are converted by a signal conversion circuit 1 of the daughter circuit board;

M3: a signal port of pulse width modulation (PWM), which inputs PWM signals having a frequency to the daughter circuit board, and the signals are rotary speed/torque control command of a motor; the PWM signals are converted by a signal conversion circuit 2 of the daughter circuit board;

M4: a R/T port for data transmission between the daughter circuit board and the control system of the user terminal, in which a bidirectional asynchronous half-duplex communication data line is employed, and voltage direct current (VDC) is employed at high level and signal ground (SG) is employed at low level; the port is connected with a bidirectional half-duplex communication circuit 6 of the daughter circuit board;

M5: a port of component object mode (COM), which is a ground line of signal lines and a common terminal of control signals;

M6: a port for fault signal output, through which the daughter circuit board outputs a fault signal to the control system of the user terminal under error state, and the motor is under error state at high level, and under normal state at low level; the fault signals are converted by a signal conversion circuit 3 of the daughter circuit board;

M7: a port of power indication, through which the daughter circuit board outputs PMW power signals to the control system of the user terminal using an open collector (OC); the power is calculated by duty cycle of PWM; the power signals are converted by a signal conversion circuit 4 of the daughter circuit board and M8: a port of speed feedback, through which the daughter circuit board outputs speed signals to the control system of the user terminal using the open collector (OC); the speed signal is calculated based on output pulse number per rotation; and the speed signals are converted by a signal conversion circuit 5 of the daughter circuit board.

The voltage of the port of mode selection is 24 V. The signal port of PWM comprises 60-100 HZ of PWM signal and has a voltage of 24 V. The power of the power indication port is calculated by duty cycle of PWM, for example, when PWM is 15-18%/10 HZ, it is ½ horsepower (one horsepower is equal to 735.50 watt); when PWM is 25-28%/10 HZ, it is ¾ horsepower; and when PWM is PWM is 35-38%/10 HZ, it is one horsepower. The daughter circuit board further comprises an identify circuit 7, which is a voltage divider circuit of serially-connected resistor R635 and resistor R636. The power supply VCC1 of the identify circuit 7 is supplied by the power supply of the mother circuit board. The output end BSEL of the identify circuit 7 is connected to the input end of the central control and process unit of the motor controller. The signal conversion circuits 1, 2, 3, 4, and 5 may be a conventional photoelectric coupling circuit unit.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A daughter circuit board for interface signal conversion, comprising:
  a) a plurality of circuit units integrated on the daughter circuit board; and
  b) eight ports for communicating with a control system of a user terminal;
  wherein said eight ports comprise:
    M1: an input port of power supply, 10-35 V DC;
    M2: a port of mode selection, which inputs signals to the daughter circuit board and employs a torque mode at low level and a speed mode at high level;
    M3: a signal port of pulse width modulation (PWM), which inputs PWM signals having a frequency to the daughter circuit board, and the signals are rotary speed/torque control command of a motor;

M4: a R/T port for data transmission between the daughter circuit board and the control system of the user terminal, in which a bidirectional asynchronous half-duplex communication data line is employed, and voltage direct current is employed at high level and signal ground is employed at low level;

M5: a port of component object mode, which is a ground line of signal lines and a common terminal of control signals;

M6: a port for fault signal output, through which the daughter circuit board outputs a fault signal to the control system of the user terminal under error state, and the motor is under error state at high level, and under normal state at low level;

M7: a port of power indication, through which the daughter circuit board outputs PMW power signals to the control system of the user terminal using an open collector; the power is calculated by duty cycle of PWM; and M8: a port of speed feedback, through which the daughter circuit board outputs speed signals to the control system of the user terminal using the open collector; the speed signal is calculated based on output pulse number per rotation.

2. The daughter circuit board of claim 1, wherein a voltage of the port of mode selection is 24 V.

3. The daughter circuit board of claim 1, wherein said signal port of PWM comprises 60-100 HZ of PWM signal and has a voltage of 24 V.

* * * * *